(12) United States Patent
Ito et al.

(10) Patent No.: US 12,013,590 B2
(45) Date of Patent: Jun. 18, 2024

(54) LENS DRIVING ACTUATOR AND PORTABLE TERMINAL

(71) Applicant: CANON DENSHI KABUSHIKI KAISHA, Chichibu (JP)

(72) Inventors: Hisatoshi Ito, Saitama (JP); Yuki Saito, Yokohama (JP); Naoki Kawakubo, Yokohama (JP); Yaomin Zhou, Hanno (JP)

(73) Assignee: Canon Denshi Kabushiki Kaisha, Chichibu (JP)

( * ) Notice: Subject to any disclaimer, the term of this patent is extended or adjusted under 35 U.S.C. 154(b) by 605 days.

(21) Appl. No.: 17/243,647

(22) Filed: Apr. 29, 2021

(65) Prior Publication Data

US 2021/0247589 A1 Aug. 12, 2021

Related U.S. Application Data

(63) Continuation of application No. PCT/JP2019/045647, filed on Nov. 21, 2019.

(30) Foreign Application Priority Data

Nov. 30, 2018 (JP) ................................ 2018-225824
Apr. 11, 2019 (JP) ................................ 2019-075441

(51) Int. Cl.
*G02B 7/10* (2021.01)
*G03B 17/04* (2021.01)
*H04N 23/55* (2023.01)

(52) U.S. Cl.
CPC .............. *G02B 7/10* (2013.01); *G03B 17/04* (2013.01); *H04N 23/55* (2023.01)

(58) Field of Classification Search
None
See application file for complete search history.

(56) References Cited

U.S. PATENT DOCUMENTS 7,228,068 B2 * 6/2007 Koyama ................ G02B 7/102
396/87
7,324,148 B2 1/2008 Takizawa et al.
(Continued)

FOREIGN PATENT DOCUMENTS

CN 1648708 A 8/2005
CN 1707303 A 12/2005
(Continued)

OTHER PUBLICATIONS

Apr. 25, 2022 Office Action in Chinese Patent Application No. 201980077376.3.
(Continued)

*Primary Examiner* — Robert E. Tallman
(74) *Attorney, Agent, or Firm* — Venable LLP

(57) ABSTRACT

A lens driving actuator includes an upper cover having an opening for passing light, a lens barrel arranged in the upper cover and including a light-transmitting lens, a driving pin formed on an outer circumferential surface of the lens barrel, a driving cam member formed to cover the outer circumference of the lens barrel, and having a cam groove that engages with the driving pin, and a driving source configured to supply a driving force to a gear formed in the driving cam member. When the driving cam member rotates along the outer circumferential surface of the lens barrel, the driving pin is guided by the cam groove, and the lens barrel moves in an optical-axis direction with respect to the upper cover.

10 Claims, 15 Drawing Sheets

(56) References Cited

U.S. PATENT DOCUMENTS

| | | |
|---|---|---|
| 7,566,179 B2 | 7/2009 | Nishizawa |
| 7,589,780 B2 | 9/2009 | Takizawa et al. |
| 8,783,977 B2 | 7/2014 | Kozu et al. |
| 10,257,398 B2 | 4/2019 | Park |
| 10,440,248 B2 | 10/2019 | Park |
| 10,649,310 B2 | 5/2020 | Ito et al. |
| 10,652,448 B2 | 5/2020 | Park |
| 2003/0090579 A1 | 5/2003 | Ohe et al. |
| 2005/0201745 A1 | 9/2005 | Nishizawa |

FOREIGN PATENT DOCUMENTS

| | | |
|---|---|---|
| JP | H09-211281 A | 8/1997 |
| JP | 2003-348403 A | 12/2003 |
| JP | 2005-189278 A | 7/2005 |
| JP | 2018-022123 A | 2/2018 |
| JP | 2018-137698 A | 8/2018 |
| WO | 02/067036 A1 | 8/2002 |
| WO | 2016/021865 A1 | 2/2016 |

OTHER PUBLICATIONS

Feb. 10, 2020 International Search Report in International Patent Appln. No. PCT/JP2019/045647.

\* cited by examiner

LENS DRIVING ACTUATOR AND PORTABLE TERMINAL

CROSS-REFERENCE TO RELATED APPLICATIONS

This application is a Continuation of International Patent Application No. PCT/JP2019/045647, filed Nov. 21, 2019, which claims the benefit of Japanese Patent Applications No. 2018-225824, filed Nov. 30, 2018, and No. 2019-075441, filed Apr. 11, 2019, the entire disclosures of which are hereby incorporated by reference.

BACKGROUND OF THE INVENTION

Field of the Invention

The present invention relates to an actuator for driving a lens arranged as an optical system such as a camera mounted in a portable terminal, and a portable terminal such as a smartphone including the actuator.

Description of the Related Art

A technique that arranges a lens and an aperture stop on the object side of an image sensor in a camera mounted in a portable terminal such as a smartphone is disclosed (Japanese Patent Laid-Open No. 2018-137698).

SUMMARY OF THE INVENTION

On the other hand, a demand has arisen for improving the optical characteristic by moving a lens in the optical-axis direction of an image sensor in a small-sized portable terminal such as a portable phone or a smartphone.

According to an aspect of the present invention, there is provided, a lens driving actuator comprising an upper cover having an opening for passing light, a lens barrel arranged in the upper cover and including a light-transmitting lens, a driving pin formed on an outer circumferential surface of the lens barrel, a driving cam member formed to cover the outer circumference of the lens barrel, and having a cam groove that engages with the driving pin, and a driving source configured to supply a driving force to a gear formed in the driving cam member, wherein when the driving cam member rotates along the outer circumferential surface of the lens barrel, the driving pin is guided by the cam groove, and the lens barrel moves in an optical-axis direction with respect to the upper cover.

Further features of the present invention will become apparent from the following description of exemplary embodiments (with reference to the attached drawings).

DESCRIPTION OF THE EMBODIMENTS

Figure 1A:
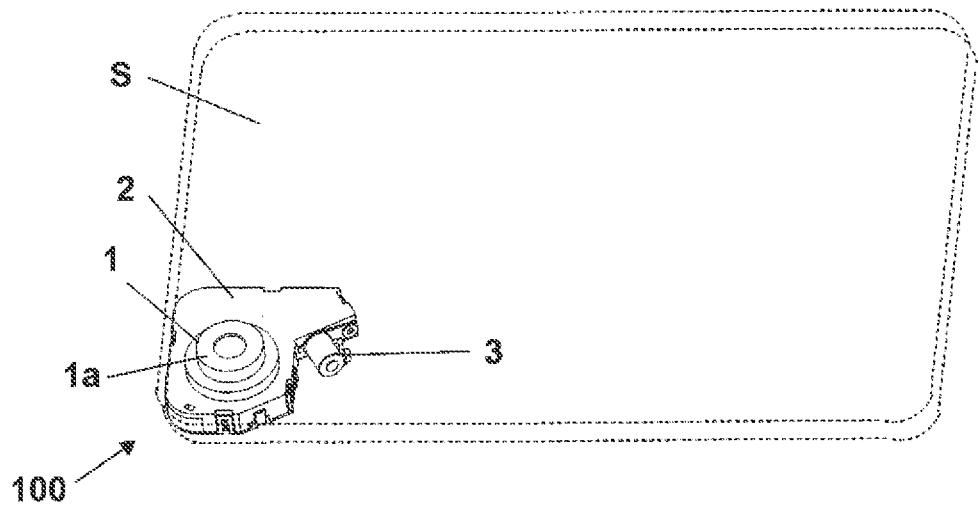
FIG. 1A is a perspective view of a driving actuator according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1B:
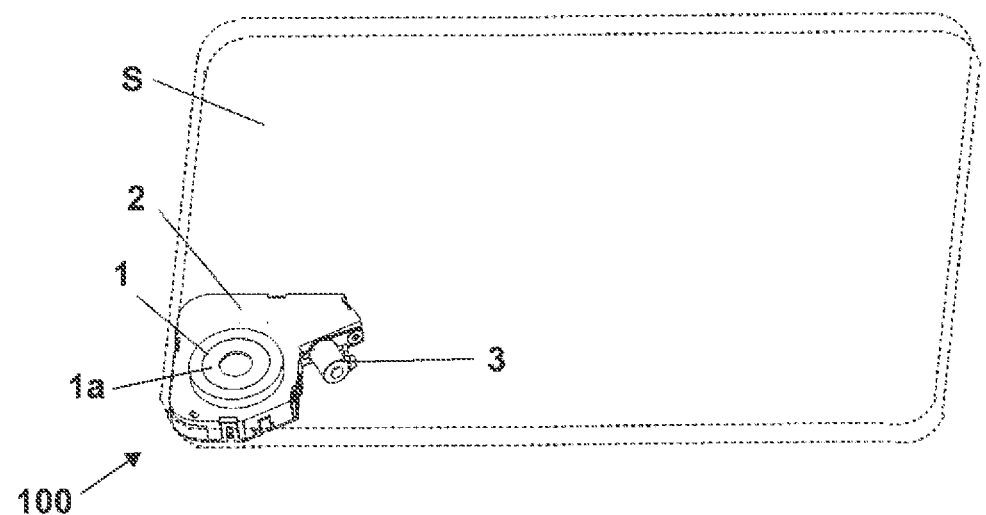
FIG. 1B is a perspective view of the driving actuator according to the embodiment of the present invention.

The first embodiment of the present invention will be explained in detail below with reference to the accompanying drawings. FIGS. 1A and 1B are perspective views of a lens driving actuator 100 according to this embodiment. As shown in FIGS. 1A and 1B, the lens driving actuator 100 is arranged on the rear surface side of a smartphone S indicated by the dotted lines. A camera module as an image sensor is arranged on the front surface side of the smartphone S with respect to the lens driving actuator 100, and a lens arranged in the lens driving actuator 100 forms an object image on the imaging plane of the image sensor.

As shown in FIGS. 1A and 1B, the lens driving actuator 100 moves a lens barrel 1 including a light-transmitting lens by driving a driving source 3, with respect to an upper cover 2 having an opening for passing light. Consequently, the lens barrel 1 can move between a position (projecting position) shown in FIG. 1A where the lens barrel 1 projects from the upper cover 2 on the rear surface of the smartphone S, and a position (accommodated position) shown in FIG. 1B where the lens barrel 1 is accommodated in the upper cover 2 on the rear surface. Note that this embodiment uses a stepping motor as the driving source 3. When the switching between the positions of the lens barrel 1 is complete, the driving of the driving source 3 is shut off. When the lens barrel 1 is in the projecting position, this position is used as an imaging position, and the camera module performs imaging. When the camera module performs imaging, a voice coil motor (to be referred to as a VCM hereinafter) housed in the lens barrel 1 moves the internal lens of the lens barrel 1 in the optical-axis direction, thereby performing a focusing operation.

An outer appearance cover member 1a made of a metal is formed on the outer surface of the lens barrel 1. A good impression can be given to the user by performing a matting process or a polishing process on the outer appearance cover member 1a. Depending on the structure of the smartphone S, the exterior is sometimes so formed that even the upper surface of the upper cover 2 can be seen from the user. In this case, the same effect as that of the outer appearance cover member 1a of the lens barrel 1 can be obtained by forming an outer appearance cover member 2b made of a metal so as to cover the upper cover 2.

Figure 2:
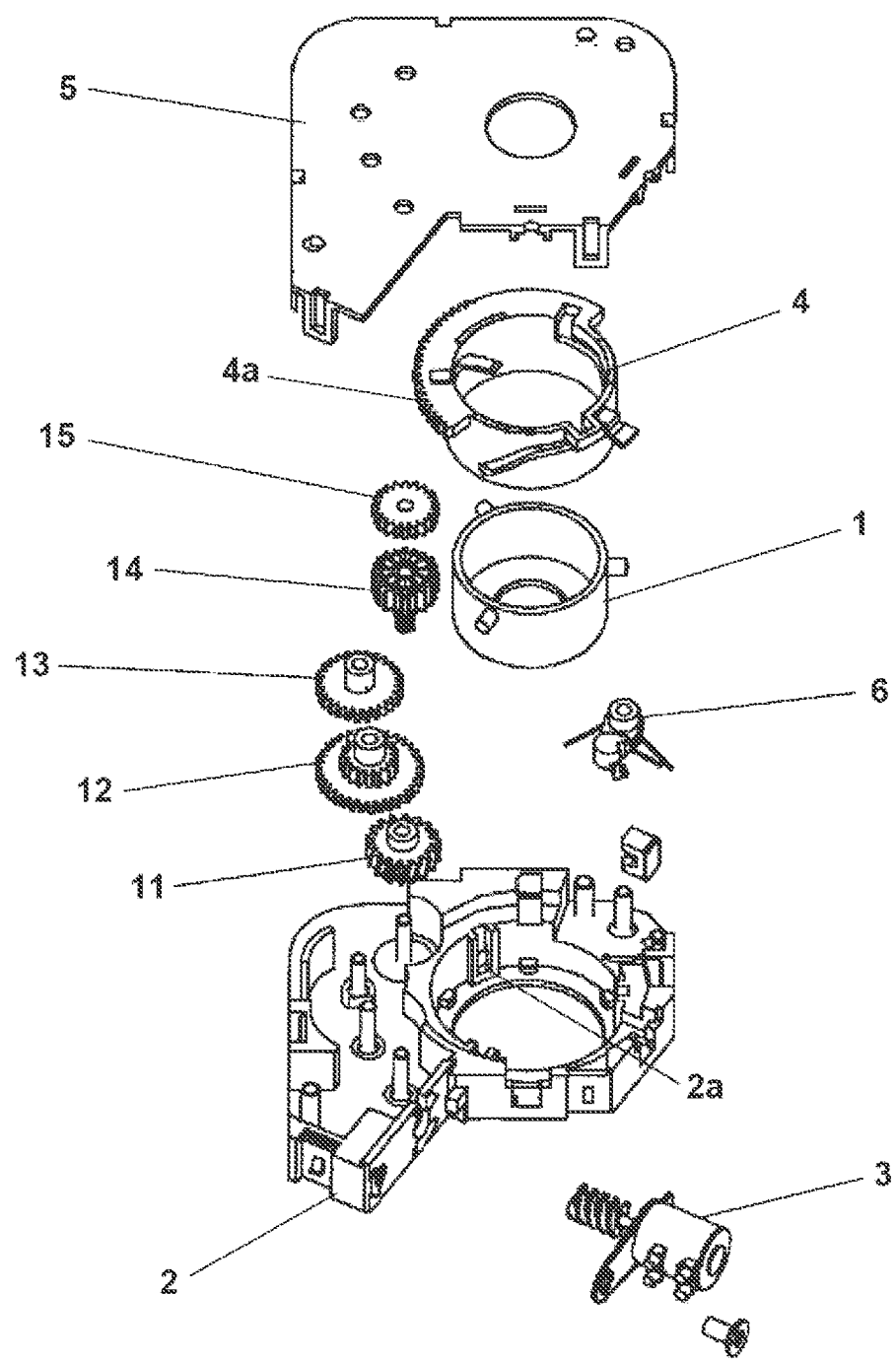
FIG. 2 is an exploded perspective view of the driving actuator according to the embodiment.

FIG. 2 shows an exploded perspective view of the lens driving actuator 100 according to this embodiment. The driving force generated by the driving source 3 is supplied by being transmitted to driving gear teeth 4a formed on a driving cam member 4 via a first gear 11, a second gear 12, a third gear 13, a fourth gear 14, and a fifth gear 15, and the lens barrel 1 moves in the optical-axis direction.

The lens barrel 1, the driving cam member 4, and the gears are accommodated in the space formed between the upper cover 2 and a lower cover 5. The lens barrel 1 is arranged inside the driving cam member 4 formed in the upper cover 2. As will be described later, a biasing member 6 for biasing the driving cam member 4 is also accommodated in the space formed between the upper cover 2 and the lower cover 5 like the abovementioned members.

Figure 3A:
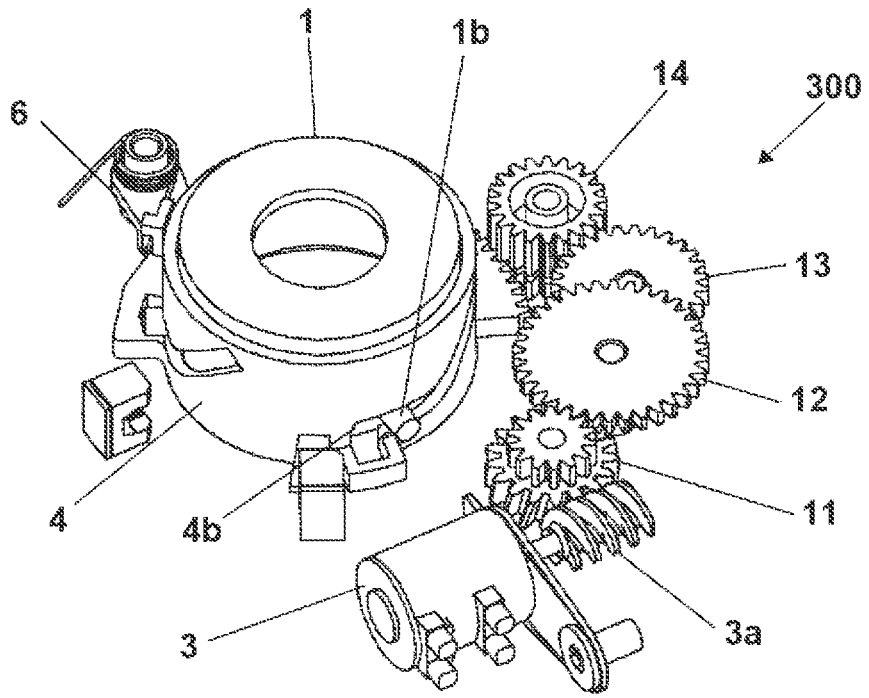
FIG. 3A is a view for explaining the operation of the driving actuator according to the embodiment of the present invention (an accommodated position)
Figure 3B:
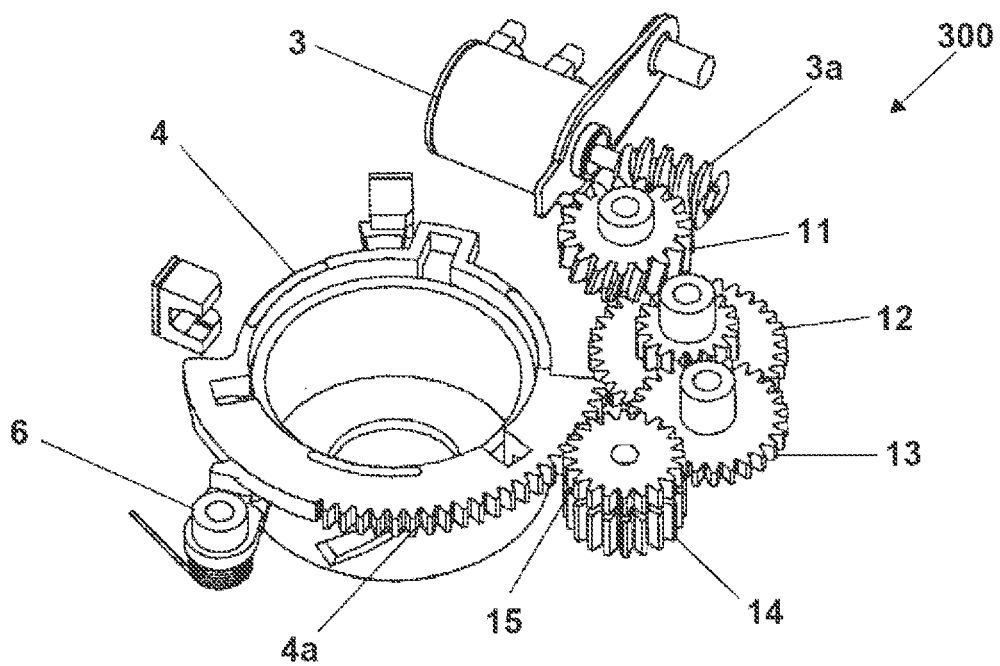
FIG. 3B is a view for explaining the operation of the driving actuator according to the embodiment of the present invention (the accommodated position)

FIGS. 3A and 3B show views for explaining the operation of the lens driving actuator 100 according to this embodiment. The driving force generated by driving the driving source 3 is transmitted to the driving cam member 4 via the gears, thereby moving the lens barrel 1 in the optical-axis direction. First, when the driving source 3 is driven, a pinion 3a rotates, and the first gear 11 meshed with the pinion 3a is rotated. The driving force is sequentially transmitted to the second gear 12, the third gear 13, the fourth gear 14, and the fifth gear 15, and is transmitted from the fifth gear 15 to the driving gear teeth 4a of the driving cam member 4, so the driving cam member 4 rotates.

Note that the fourth gear 14 and the fifth gear 15 do not mesh with each other, but a slip clutch (torque limiter) exists between them and shuts off driving transmission between the fourth gear 14 and the fifth gear 15 if driving exceeding the driving force of the driving source 3 is transmitted. This makes it possible to protect each gear and the driving source 3 if, for example, the lens barrel 1 in the projecting position is forcedly pushed and an excessive load is produced.

When the driving cam member 4 is rotated by the driving force transmitted to the driving cam member 4, a driving pin 1b that is formed on the outer circumferential surface of the lens barrel 1 and engages with a cam groove 4b formed in the driving cam member 4 is guided in the optical-axis direction, so the lens barrel 1 moves in the optical-axis direction. FIGS. 3A and 3B show a state in which the lens barrel 1 is in the accommodated position (a retracted position). FIG. 3A is a perspective view of the rear surface side of the smartphone S. FIG. 3B is a perspective view of the front surface side of the smartphone S.

As shown in FIG. 3B, the cam groove 4b is formed in an end portion (projecting side end portion) on the side in which the lens barrel 1 is in the projecting position, so that the lens barrel 1 always continuously moves in the optical-axis direction in accordance with the rotation of the driving cam member 4. On the other hand, as shown in FIG. 3A, a dead zone is formed in the cam groove 4b in an end portion (accommodated side end portion) on the side in which the lens barrel 1 is in the accommodated position, such that the lens barrel 1 does not move in the optical-axis direction even when the driving cam member 4 rotates. Note that when the lens barrel 1 changes to the projecting position, the driving pin 1b does not come in contact with the projecting side end portion of the cam groove 4b, but comes in contact with an abutting portion 2a formed on the upper cover 2 shown in FIG. 2. Therefore, no dead zone is formed in the cam groove 4b in the projecting side end portion. That is, in the projecting position of the lens barrel 1, the driving force of the driving source 3, which is transmitted to the lens barrel 1 via the driving cam member 4, or the biasing force of the biasing member 6 (to be described later), pushes the driving pin 1b of the lens barrel 1 against the abutting portion 2a of the upper cover 2, thereby implementing a stable stop position of the lens barrel 1 in the optical-axis direction. Also, as will be described in detail later, when, for example, the smartphone S is laid on its rear surface with the lens barrel 1 being in the projecting position, the lens barrel 1 can move toward the accommodated position. This can protect the driving pin 1b from being pressed and damaged by the side wall of the cam groove 4b.

Figure 4:
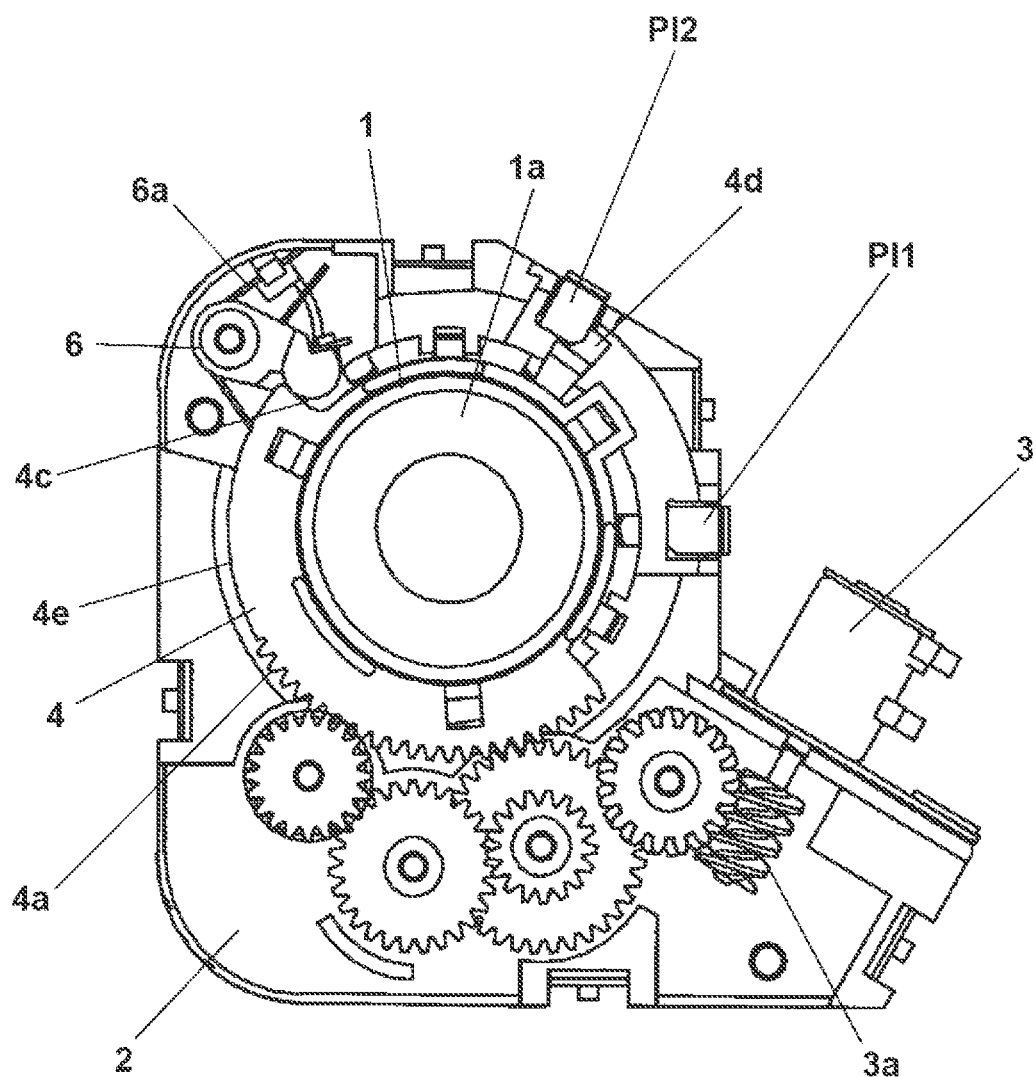
FIG. 4 is a bottom view of the driving actuator according to the embodiment of the present invention (a projecting position)

Whether the lens barrel 1 has arrived at the projecting position or the accommodated position is determined by using a photointerrupter (to be referred to as a PI hereinafter) arranged for each of these positions. A light shielding portion 4d for shielding the PI from light is formed in the driving cam member 4 as shown in FIG. 4. In the accommodated position, the light shielding portion 4d covers a PI1 corresponding to the accommodated position. In the projecting position, the light shielding portion 4d covers a PI2 corresponding to the projecting position.

If the light shielding portion 4d does not cover either PI after control for moving the lens barrel 1 to either position is performed, it is determined that an error has occurred, and an operation of returning the lens barrel 1 to the accommodated position is performed.

In this embodiment, the stepping motor is used as the driving source 3. After the arrival at the projecting position is detected, therefore, the position of the lens barrel 1 can completely be brought into contact with the abutting portion 2a in the projecting position by further operating the lens barrel 1 by a predetermined number of steps. In addition, it is unnecessary to wastefully drive the driving source 3.

In the smartphone S, control is so performed as to move the lens barrel 1 toward the projecting position when, for example, a camera application is activated or a control instruction for projecting the lens barrel 1 to the projecting position is issued. In this state (in which the lens barrel 1 is in the projecting position), the lens barrel 1 starts moving toward the front surface side of the smartphone S if the user lays the smartphone S on its rear surface on a desk or the like or the user pushes the distal end (the end portion on the rear surface side) of the lens barrel 1 with his or her finger. If the driving force is always transmitted from the driving source 3, the projecting position can be held even when an external force of moving the lens barrel 1 toward the front surface side is applied, but the power consumption increases in this case.

In this embodiment, however, as shown in FIG. 4, no dead zone is formed in the projecting side end portion of the driving cam member 4 so that the lens barrel 1 easily moves to the front surface side. In addition, the biasing member 6 is arranged so as to apply the biasing force that moves the lens barrel 1 to the rear surface side (projecting position side). Accordingly, even when an external force of moving the lens barrel 1 to the front surface side is applied, the lens barrel 1 can be held in the projecting position without driving the driving source 3 within the range in which the biasing force of the biasing member 6 is applied.

The biasing member 6 has a main body, and a torsion spring 6a that engages with the upper cover 2. In the biasing position shown in FIG. 4, the biasing member 6 applies the biasing force in a direction of pushing a portion 4c to be pushed formed in the periphery of the driving cam member 4, thereby biasing the driving cam member 4 toward the projecting position. In the projecting position and its vicinity, therefore, the lens barrel 1 is biased toward the rear surface of smartphone S by the biasing member 6. Accordingly, even when the lens barrel 1 is pushed toward the front surface side by an external force produced by a user's operation or the like, the biasing force of the biasing member 6 can return the lens barrel 1 to the projecting position after the external force is canceled.

Also, as the driving cam member 4 rotates so that the lens barrel 1 moves from the projecting position to the accommodated position, the contact state between the main body and the portion 4c to be pushed is canceled, and the biasing member 6 comes in contact with an outer circumferential portion 4e formed on an extension of the driving gear teeth 4a. In this state, the biasing member 6 does not apply the biasing force to the driving cam member 4 in its rotational direction, and hence does not significantly interfere with the rotational operation of the driving cam member 4.

Note that the biasing member 6 biases the lens barrel 1 via the driving cam member 4 in this embodiment, but the biasing member 6 may also directly bias the lens barrel 1.

FIG. 4 shows a bottom view (a view seen from the front surface side of the smartphone S) in a state in which the lens barrel 1 of the lens driving actuator 100 according to this embodiment is in the projecting position (an extended position). As shown in FIG. 4, the biasing member 6 biases the driving cam member 4 by the main body that is pivoted by the torsion spring 6a arranged between the biasing member 6 and the upper cover 2. In the space between the upper cover 2 and the lower cover 5, the biasing member 6 is formed on the side opposite to the lens barrel 1 (in particular, in the corner of the upper cover 2 around the driving cam member 4 formed into the shape of a circle) on the side opposite to the side on which pinion 3a of the driving motor 3 and the driving gear teeth 4a are formed. This makes it possible to arrange the biasing member 6 in a saved space by effectively using the space around the almost cylindrical lens barrel 1. In other words, to arrange the biasing member 6 on the side opposite to the lens barrel 1, the portion 4c to be pushed to be formed in the outer circumferential portion 4e of the flange of the driving cam member 4 in which the driving gear teeth 4a are formed is formed in a position spaced apart from the driving gear teeth 4a (a position facing the driving source 3 and the lens barrel 1).

Second Embodiment

Figure 5A:
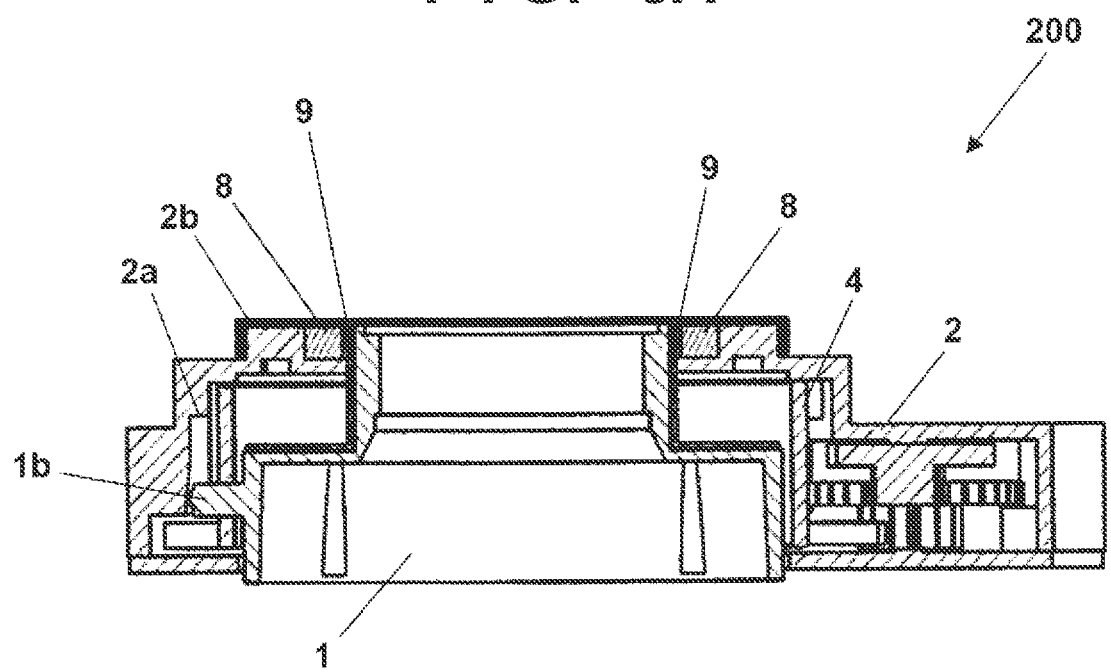
FIG. 5A is a sectional view of a driving actuator according to another embodiment of the present invention (the accommodated position)
Figure 5B:
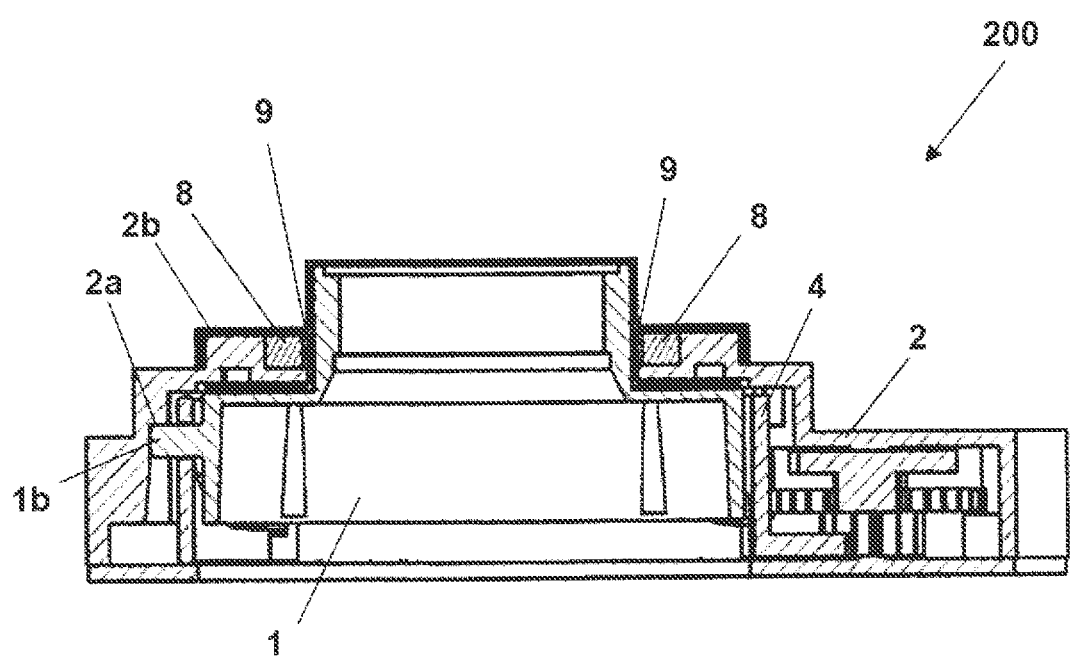
FIG. 5B is a sectional view of the driving actuator according to the other embodiment of the present invention (the projecting position)

A lens driving actuator according to the second embodiment of the present invention will be explained below. FIGS. 5A and 5B show sectional views of a lens driving actuator 200 according to this embodiment. Note that the basic configuration of this embodiment is the same as that of the first embodiment, so an explanation of the same components will be omitted by using the same reference numerals, and only different components will be explained. A recent smartphone S often has a dustproof/waterproof function as a standard function, so a lens barrel 1 (a projecting portion) of this embodiment includes components for the purposes of dustproof and waterproof.

The lens barrel 1 that performs a projecting operation and an accommodating operation requires a gap for the operations between the lens barrel 1 and an upper cover 2, but foreign matter such as fine dirt, dust, and waterdrops may enter from this gap. To prevent this, the gap is filled with a dustproof member 8 formed in contact with the outer circumferential portion of the lens barrel 1. The dustproof member 8 is arranged between the upper cover 2 and an outer appearance cover member 2b formed on the outer surface of the upper cover 2, such that the dustproof member 8 is in contact with the lens barrel 1. This can achieve an outer appearance that gives a good impression to the user and the dustproof/waterproof function at the same time, and can also reduce the number of parts.

The dustproof member 8 will be explained in detail below. As shown in FIGS. 5A and 5B, the dustproof member 8 must fill the gap along the outer circumferential shape of the lens barrel 1, so a uniform rigid body is unsuitable. Since the member preferably deforms so as to compensate for slight shape differences between individual parts, it is desirable to use a material that deforms with elasticity like sponge, for example, urethane foam. This embodiment uses urethane foam.

On the other hand, if the contact pressure of the dustproof member 8 that comes in contact with the outer circumference of the lens barrel 1 is too high or if the frictional force of the contact surface is too large, the operation of the lens barrel 1 is disturbed, and this is disadvantageous for the torque of a driving source 3. In this case, it becomes necessary to use a driving source having a size capable of outputting a larger torque, or to reduce the speed by using more speed reduction gears. This elongates or enlarges the gear train. Therefore, a material capable of deforming at a low pressure is suitable for the material of the dustproof member 8, and the surface of the material must have a low friction. For example, a polytetrafluoroethylene sheet as an example of a sliding sheet 9 is formed on the contact surface side of the dustproof member 8 as in this embodiment, or the surface itself of the dustproof member 8 is covered with a carbon particle coating (DLC coat). This facilitates the achievement of this object.

The dustproof member 8 will be explained below with reference to the sectional views of FIG. 5. FIG. 5A shows a state in which the lens barrel 1 is in an accommodated position. FIG. 5B shows a state in which the lens barrel 1 is in a projecting position. When the driving force from the driving source 3 is transmitted via the gear train, a driving cam member 4 is rotated, and the lens barrel 1 formed inside it moves in the optical-axis direction. Note that lenses arranged inside the lens barrel 1 are not shown in order to simplify the explanation. In the projecting position shown in FIG. 5B, as explained in the first embodiment, a driving pin 1b of the lens barrel 1 abuts against an abutting portion 2a of the upper cover 2, and the lens barrel 1 moves to the projecting position. Note that each of the sectional views shown in FIGS. 5A and 5B is a sectional view taken along a line A-A in FIG. 8 (to be described later).

While the lens barrel 1 is moving from the accommodated position to the projecting position as described above, the outer circumferential surface of the lens barrel 1 and the dustproof member 8 are in slidable contact with each other. As described previously, therefore, it is possible to secure the dustproof/waterproof function while improving the slidability of the lens barrel 1 by forming the contact surface side (inner circumferential surface side) of the dustproof member 8 or the outer circumferential surface of the lens barrel 1 by using a low-friction member.

Figure 6A:
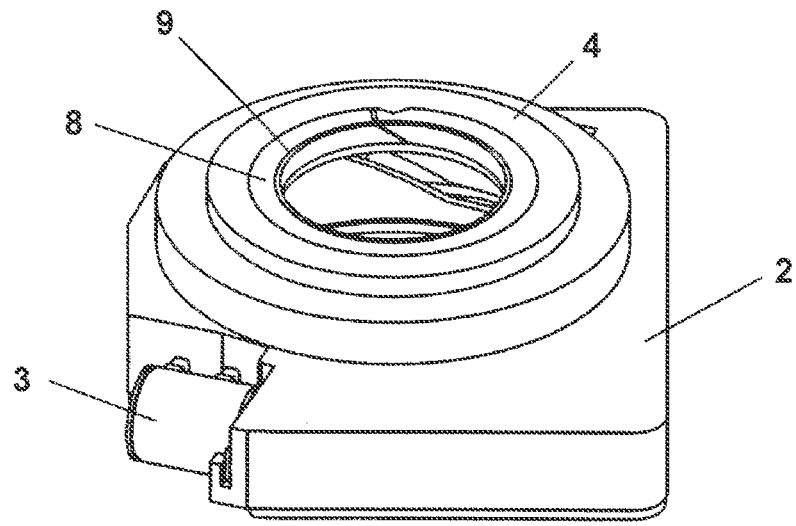
FIG. 6A is a perspective view of the driving actuator according to the other embodiment of the present invention.

FIG. 6A shows a perspective view of a state in which the lens barrel 1 is not illustrated for the sake of explanation in the lens driving actuator 200 according to this embodiment.

Figure 6B:
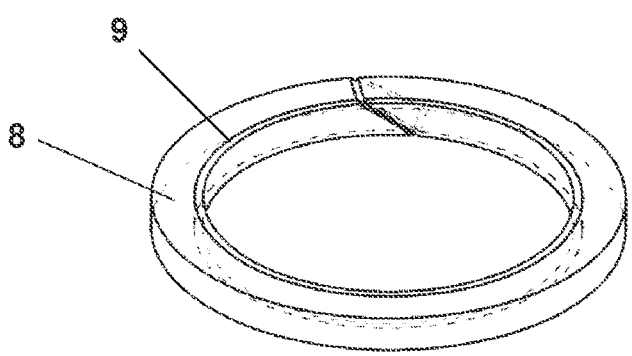
FIG. 6B is a view showing a dustproof member and a sliding sheet alone.
Figure 6C:
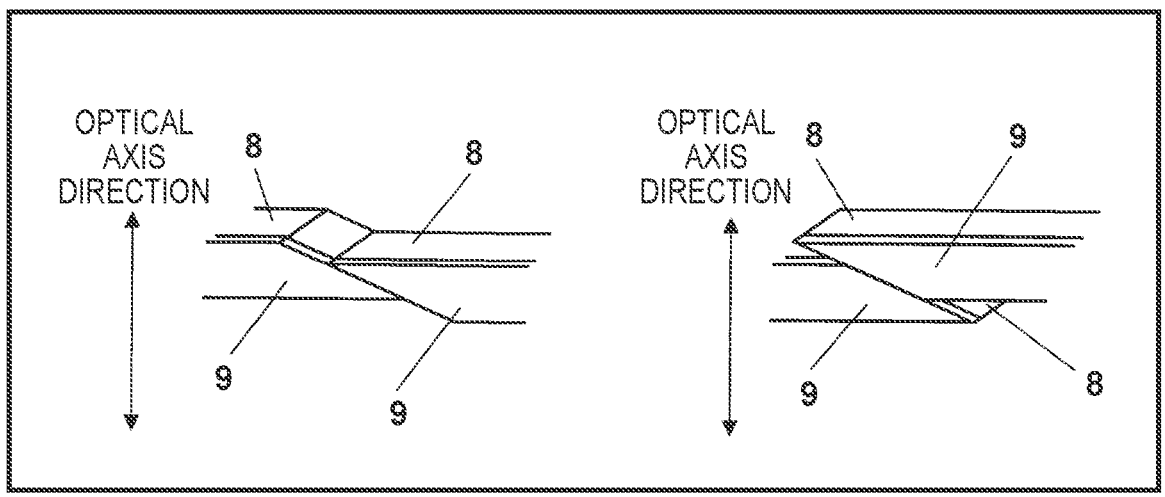
FIG. 6C is a schematic view of the dustproof member and the sliding sheet.

FIG. 6B specifically shows the dustproof member 8 and the sliding sheet 9. A part of the ring-like member has a cut portion that is obliquely cut in the optical-axis direction. The dustproof member 8 formed as described above is pasted on the inner circumferential surface of the driving cam member 4 by adhesion or the like. The dustproof member 8 and the sliding sheet 9 are formed to be integrated by adhesion or the like, but the ring is partially obliquely cut. When pasting the dustproof member 8 on the driving cam member 4, therefore, the end portions of the dustproof member 8 are shifted in the optical-axis direction as shown in a schematic view of FIG. 6C. This makes it possible to absorb a shift produced by tolerance or the like between the dustproof member 8 and the driving cam member 4, and paste the dustproof member 8 in tight contact with the driving cam member 4 by preventing the formation of a gap in the circumferential direction of the dustproof member 8.

Figure 7:
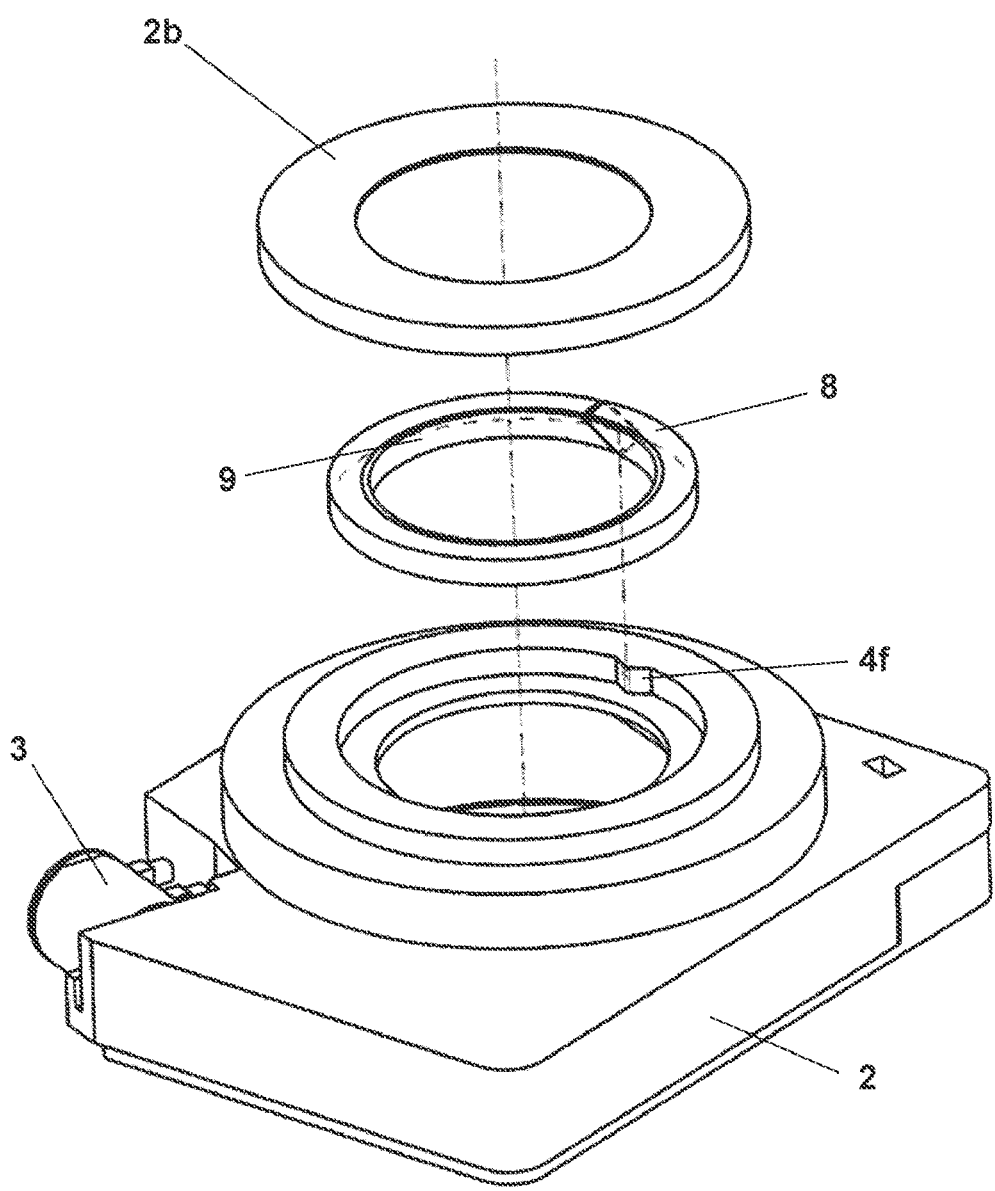
FIG. 7 is an exploded perspective view of a driving actuator according to the second embodiment of the present invention.

On the other hand, the adhesion to the lens barrel 1 decreases in some cases when the dustproof member 8 is cut. In this embodiment, a sheet end portion pressing projection 4f is formed in that position of the driving cam member 4, which corresponds to the cut portion of the dustproof member 8. FIG. 7 shows an exploded perspective view of the lens driving actuator 200 according to this embodiment. Note that FIG. 7 shows the outer appearance cover member 2b and the dustproof member 8 including the sliding sheet 9 in an exploded state, and does not show the lens barrel 1.

As described above, the dustproof member 8 is pasted such that its cut portion is positioned in the portion where a sheet end portion pressing projection 4f of the driving cam member 4 is formed. This makes it possible to secure the above-described dustproofness and waterproofness in the circumferential direction, and improve the adhesion to the lens barrel 1 by easily achieving a compression force on the side of the lens barrel 1 by the sheet end portion pressing projection 4f.

Note that in this embodiment, the sheet end portion pressing projection 4f has a shape projecting into the form of a triangular pillar from the inner circumferential surface of the driving cam member 4. However, the present invention is not limited to this. For example, the sheet end portion pressing projection 4f may also be formed to evenly project over the entire position that overlaps, in the circumferential direction, the cut portion obliquely formed in the dustproof member 8, or to project into the form of a semicircular pillar.

Figure 8:
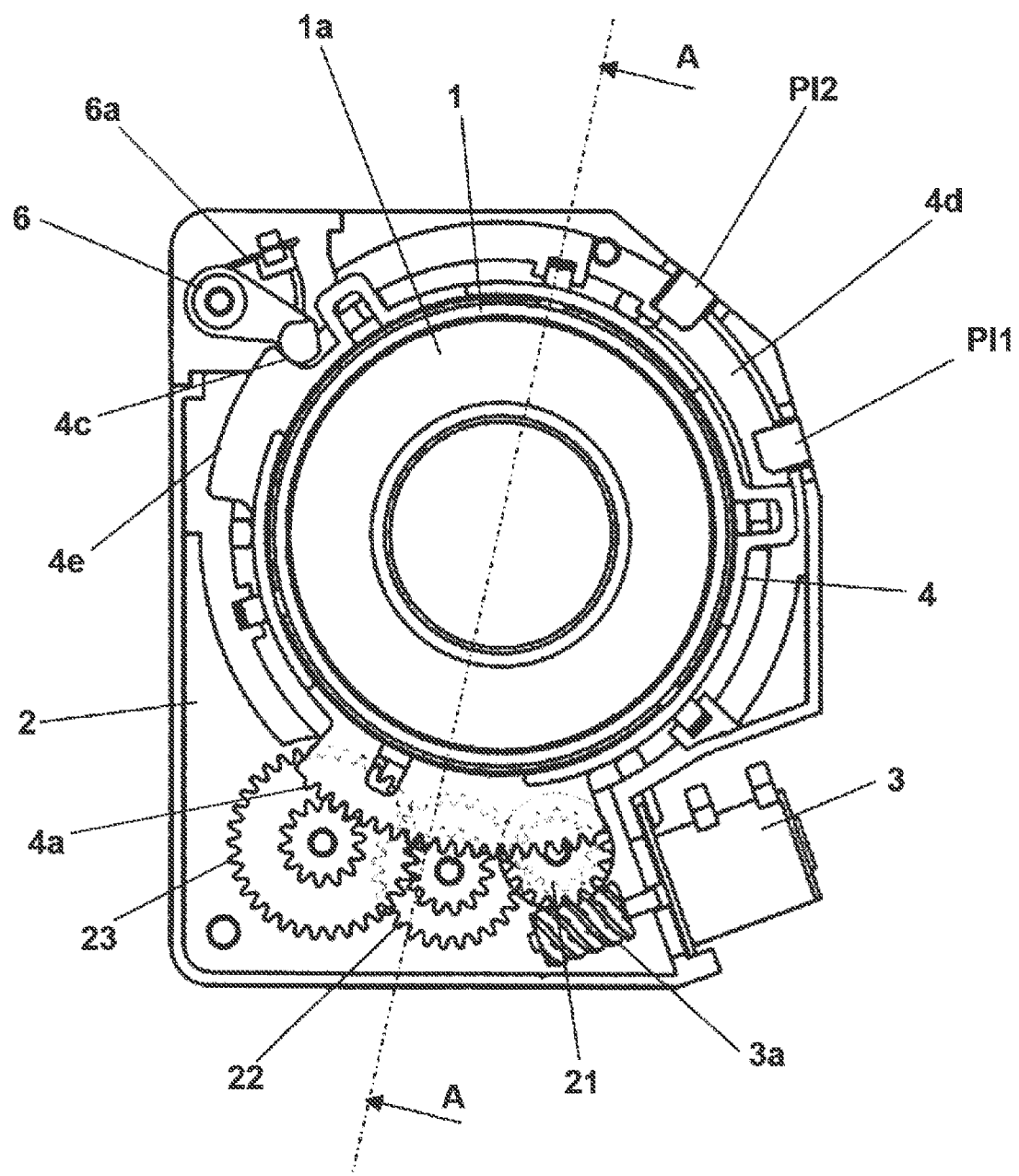
FIG. 8 is a bottom view of the driving actuator according to the second embodiment of the present invention (the projecting position)

FIG. 8 shows a bottom view of the lens driving actuator 200 according to this embodiment. The basic structure is the same as that of the first embodiment. In this embodiment, however, gears for transmitting the driving force of the driving source 3 to driving gear teeth 4a include a first gear 21, a second gear 22, and a third gear 23. In this embodiment, a slip clutch like that of the first embodiment is not formed, all the gears from the first gear 21 to the third gear 23 are formed by stepped gears, and the speed reduction ratio is increased.

Also, all of the first gear 21, the second gear 22, and the third gear 23 are so arranged as to overlap the driving gear teeth 4a of the driving cam member 4 in the optical-axis direction. Accordingly, it is possible to save the space in the direction (surface direction) perpendicular to the optical axis while using the stepped gears.

In this embodiment, a portion 4c to be pushed is formed on an outer circumferential portion 4e formed independently of the flange of the driving cam member 4 on which the driving gear teeth 4a are formed, and a biasing member 6 is formed on the diagonal side to the driving source 3 in the housing of the lens driving actuator 200. This also saves the space in the surface direction.

In addition, in the projecting position of the lens barrel 1 shown in FIG. 8, a light shielding portion 4d shields both a PI1 and a PI2 from light. As the driving cam member 4 is pivoted toward the accommodated position, the light shielding portion 4d first comes off from the PI2 and then comes off from the PI1 when the driving cam member 4 arrives at the accommodated position. Accordingly, the position is the projecting position when both the PI1 and the PI2 are shielded from light, and is the accommodated position when neither is shielded from light.

As explained in the above embodiments, the projecting position and the accommodated position of the lens driving actuators 100 and 200 can be switched. In a portable terminal such as the smartphone S including the lens driving actuator, the projecting position in which the lens barrel 1 projects from the housing of the terminal is used as an imaging position. When an image sensor performs imaging, therefore, the imaging can be performed by moving the lens barrel 1 to the imaging position while achieving the dustproof/waterproof performance.

Third Embodiment

Figure 9A:
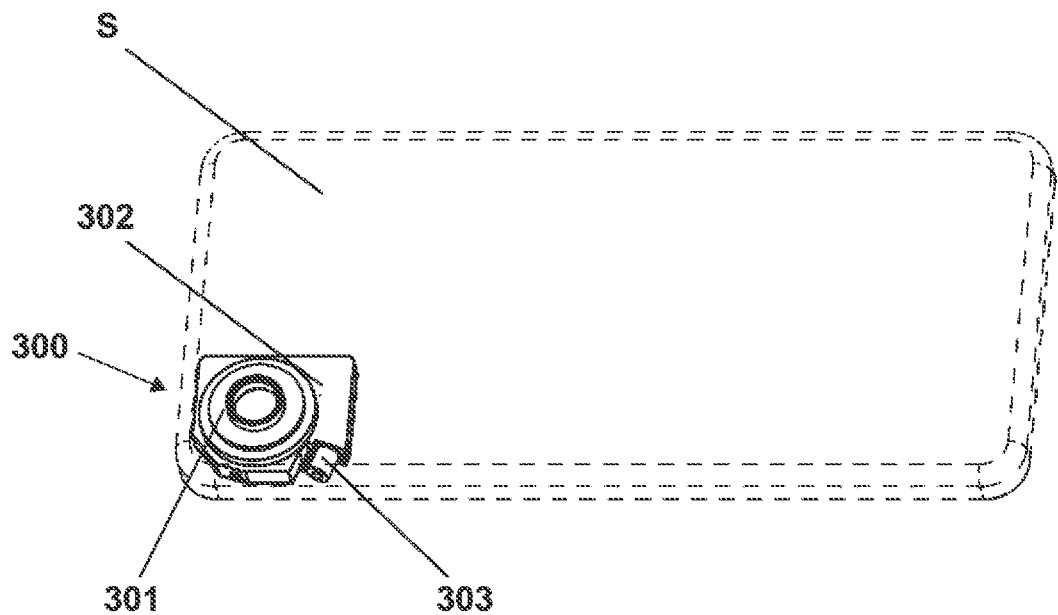
FIG. 9A is a perspective view of a driving actuator according to the third embodiment of the present invention.
Figure 9B:
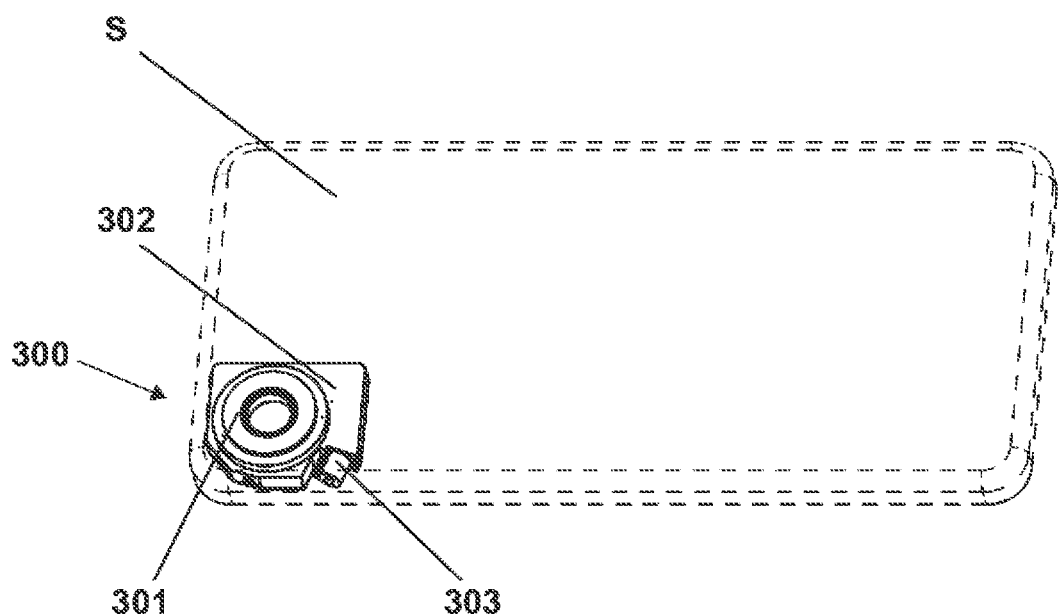
FIG. 9B is a perspective view of a driving actuator according to the third embodiment of the present invention.

The third embodiment of the present invention will be explained in detail below with reference to the accompanying drawings. FIGS. 9A and 9B are perspective views of a lens driving actuator 300 according to this embodiment. As shown in FIGS. 9A and 9B, the lens driving actuator 300 is arranged on the rear surface side of a smartphone S indicated by the dotted lines. A camera module as an image sensor is arranged on the front surface side of the smartphone S with respect to the lens driving actuator 300, and a lens arranged in the lens driving actuator 300 forms an object image on the imaging plane of the image sensor.

As shown in FIGS. 9A and 9B, the lens driving actuator 300 moves a lens barrel 301 including a light-transmitting lens by driving a driving motor 303, with respect to an upper cover 302 having an opening for passing light, thereby switching a position (projecting position) shown in FIG. 9A where the lens barrel projects from the rear surface of the smartphone S, and a position (accommodated position) shown in FIG. 9B where the lens barrel is accommodated in the rear surface. Note that this embodiment uses a stepping motor as the driving motor 303. When the switching between the positions of the lens barrel 301 is complete, the driving of the driving motor 303 is shut off. When the lens barrel 301 is in the projecting position, this position is used as an imaging position, and the camera module performs imaging.

Figure 10:
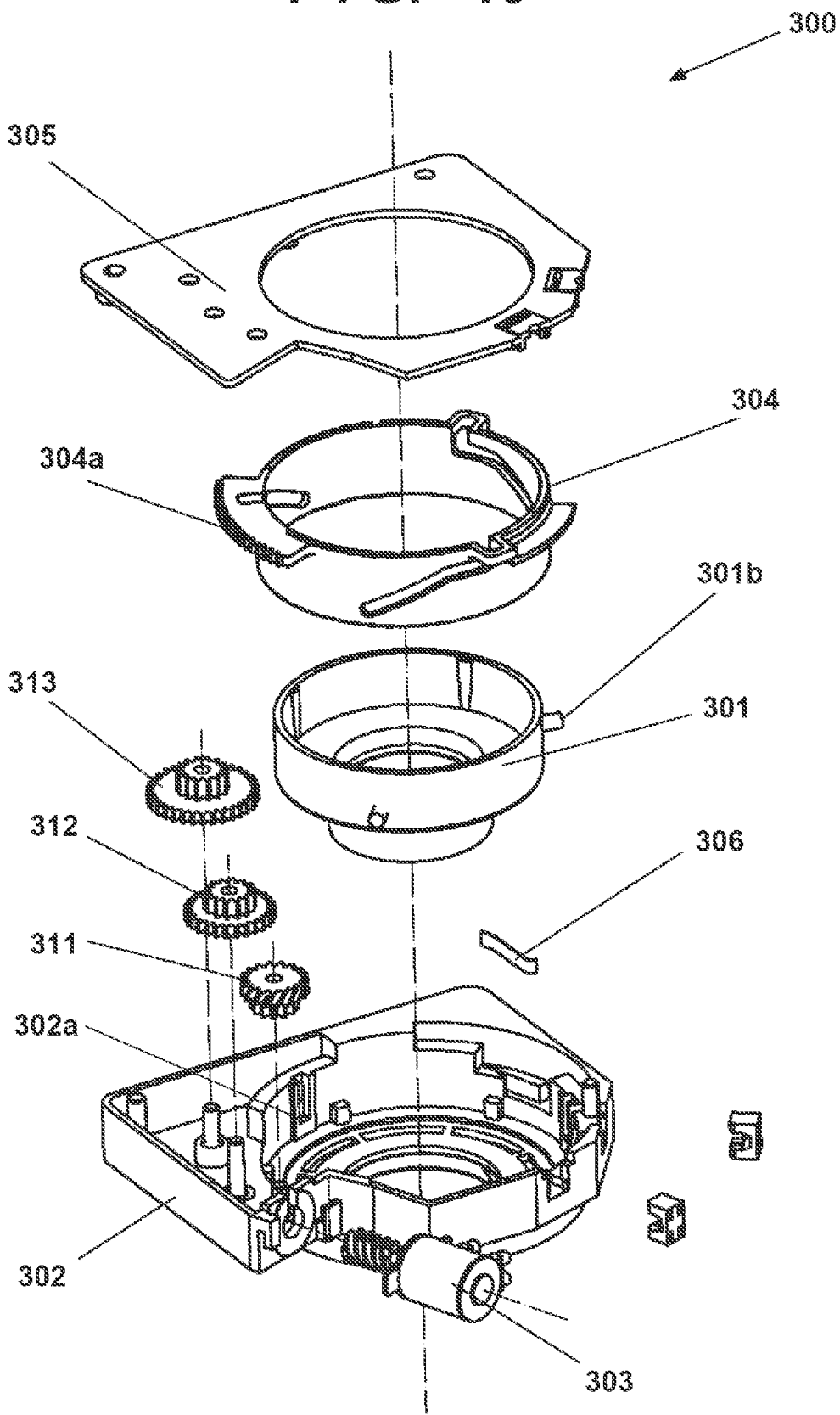
FIG. 10 is an exploded perspective view of the driving actuator according to the third embodiment of the present invention.

FIG. 10 shows an exploded perspective view of the lens driving actuator 300 according to this embodiment. The driving force generated by the driving motor 303 is supplied by being transmitted to driving gear teeth 304a formed on a driving cam member 304 via first to third gears 311 to 313, and the lens barrel 301 moves in the optical-axis direction.

The lens barrel 301, the driving cam member 304, and the gears are accommodated in the space formed between the upper cover 302 and a lower cover 305. As will be described later, a biasing member 306 for biasing the driving cam member 304 is also accommodated in the space formed between the upper cover 302 and the lower cover 305 like the abovementioned members.

Figure 11A:
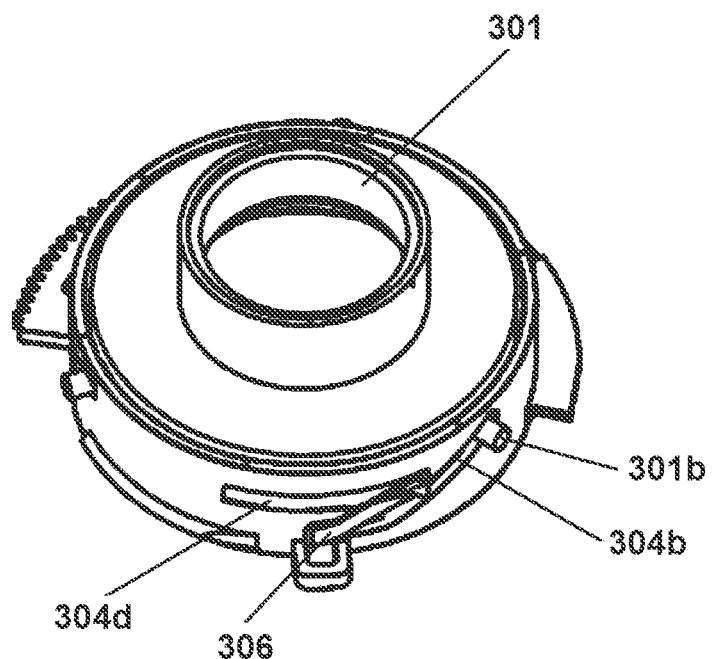
FIG. 11A is a view for explaining the operation of the driving actuator according to the third embodiment of the present invention.
Figure 11B:
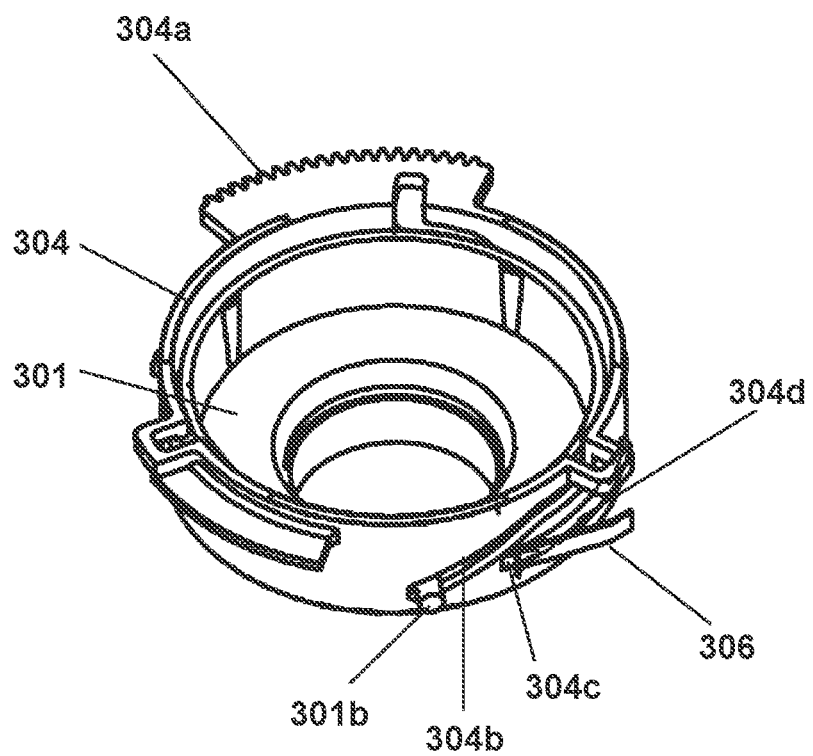
FIG. 11B is a view for explaining the operation of the driving actuator according to the third embodiment of the present invention.

When the driving cam member 304 is rotated by the driving force transmitted to the driving cam member 304, a driving pin 301b that is formed on the outer circumferential surface of the lens barrel 301 and engages with a cam groove 304b formed in the driving cam member 304 is guided in the optical-axis direction, so the lens barrel 301 moves in the optical-axis direction. FIGS. 11A and 11B show a state in which the lens barrel 301 is in the projecting position. FIG. 11A is a perspective view of the rear surface side of the smartphone S. FIG. 11B is a perspective view of the front surface side of the smartphone S.

As shown in FIGS. 11A and 11B, the cam groove 304b is formed in an end portion (projecting side end portion) on the side in which the lens barrel 301 is in the projecting position, so that the lens barrel 301 always continuously moves in the optical-axis direction in accordance with the rotation of the driving cam member 304. On the other hand, a dead zone is formed in the cam groove 304b in an end portion (accommodated side end portion) on the side in which the lens barrel 301 is in the accommodated position, such that the lens barrel 301 does not move in the optical-axis direction even when the driving cam member 304 rotates. Note that when the lens barrel 301 changes to the projecting position, the driving pin 301b does not come in contact with the projecting side end portion of the cam groove 304b, but comes in contact with an abutting portion 302a formed on the upper cover 302 shown in FIG. 10.

In the smartphone S, control is so performed as to move the lens barrel 301 toward the projecting position when, for example, a camera application is activated. In this state, the lens barrel 301 starts moving toward the front surface side of the smartphone S if the user lays the smartphone S on its rear surface on a desk or the like or the user pushes the distal end (the end portion on the rear surface side) of the lens barrel 301 with his or her finger. If the driving force is always transmitted from the driving motor 303, the projecting position can be held even when an external force of moving the lens barrel 301 toward the front surface side is applied, but the power consumption increases in this case.

In this embodiment, however, no dead zone is formed in the projecting side end portion of the driving cam member 304 so that the lens barrel 301 easily moves to the front surface side. In addition, the biasing member 306 is arranged so as to apply the biasing force of moving the lens barrel 301 to the rear surface side. Accordingly, even when an external force of moving the lens barrel 301 to the front surface side is applied, the lens barrel 301 can be held in the projecting position by the biasing force of the biasing member 306 without driving the driving motor 303.

Figure 12:
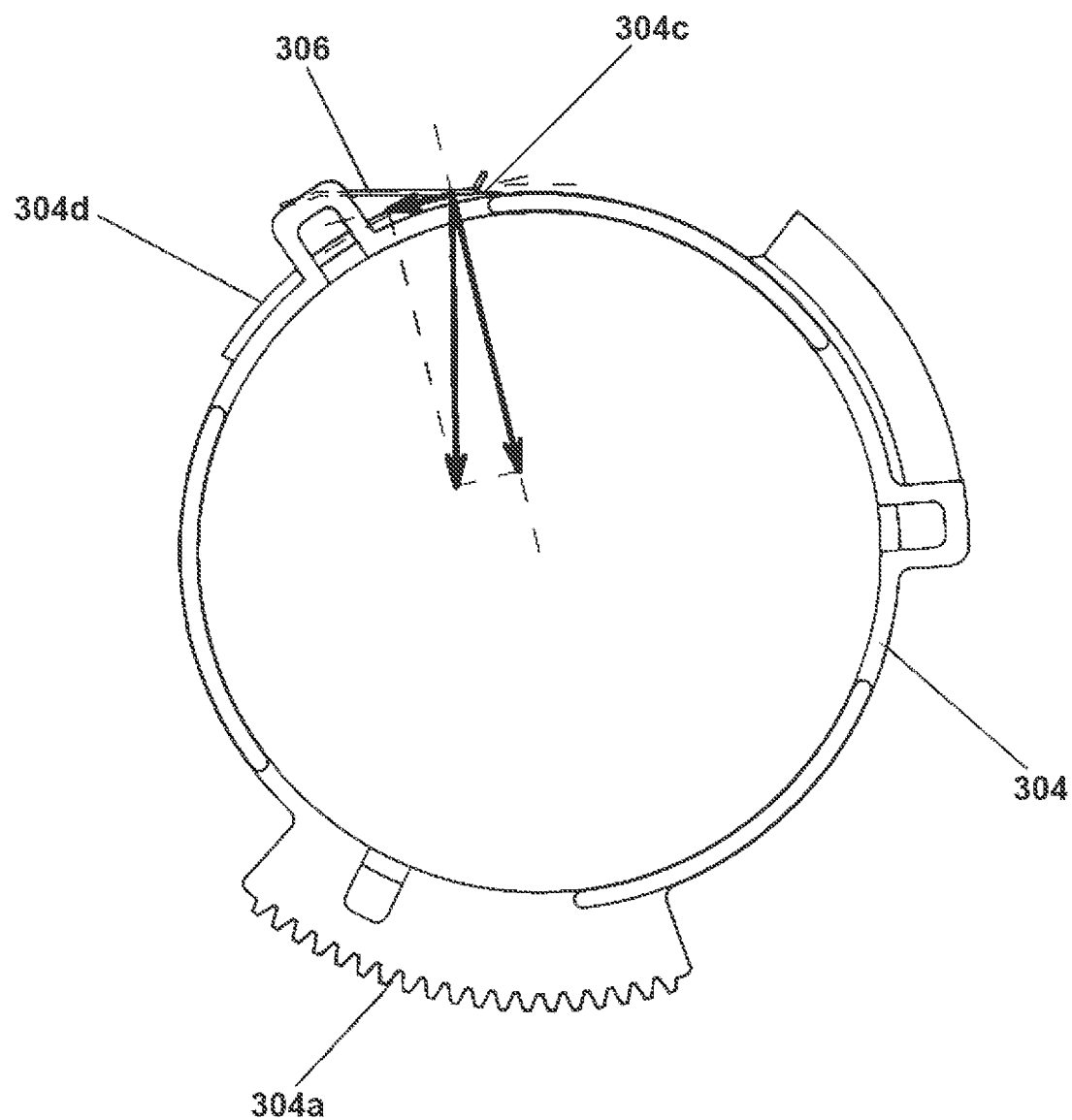
FIG. 12 is a bottom view of the driving actuator according to the third embodiment of the present invention (the projecting position)

In this embodiment, the biasing member 306 is a leaf spring and is formed as a plate-like elastic member. In the biasing position shown in FIGS. 11A and 11B, the biasing member 306 pushes a slope portion of a portion 304c to be pushed formed on the outer circumferential surface of the driving cam member 304. FIG. 12 shows a front view of the biasing member 306 and the driving cam member 304 of this embodiment. The portion 304c to be pushed has a slope shape. When pushed by the biasing member 306, the portion 304c to be pushed rotates the driving cam member 304, thereby biasing the driving cam member 304 toward the projecting position side. In the projecting position and its vicinity, therefore, the lens barrel 301 is biased toward the rear surface side of the smartphone S. Accordingly, even when the lens barrel 301 is pushed toward the front surface side by an external force produced by a user's operation or the like, the biasing force of the biasing member 306 can return the lens barrel 301 to the projecting position after the external force is canceled.

Also, as the driving cam member 304 rotates so that the lens barrel 301 moves from the projecting position to the accommodated position, the contact state between the biasing member 306 and the portion 304c to be pushed is canceled, and the biasing member 306 comes in contact with an outer circumferential portion 304d smoothly connected to the portion 304c to be pushed. In this state, the biasing member 306 does not apply the biasing force to the driving cam member 304 in its rotational direction, and hence does not interfere with the rotational operation of the driving cam member 304.

More specifically, as shown in FIG. 12, when the biasing member 306 formed by a leaf spring pushes the slope portion of the portion 304c to be pushed, the force applied on the slope portion is divided into the radial direction and circumferential direction of the driving cam member 304. The force in the circumferential direction biases the driving cam member 304 to the projecting position side, and causes the above-described action. On the other hand, the force in the radial direction biases the driving cam member 304 in a direction in which the driving gear teeth 304a are formed. Consequently, backlash removal between the driving gear teeth 304a and the third gear 313 can be performed as will be described later.

Figure 13A:
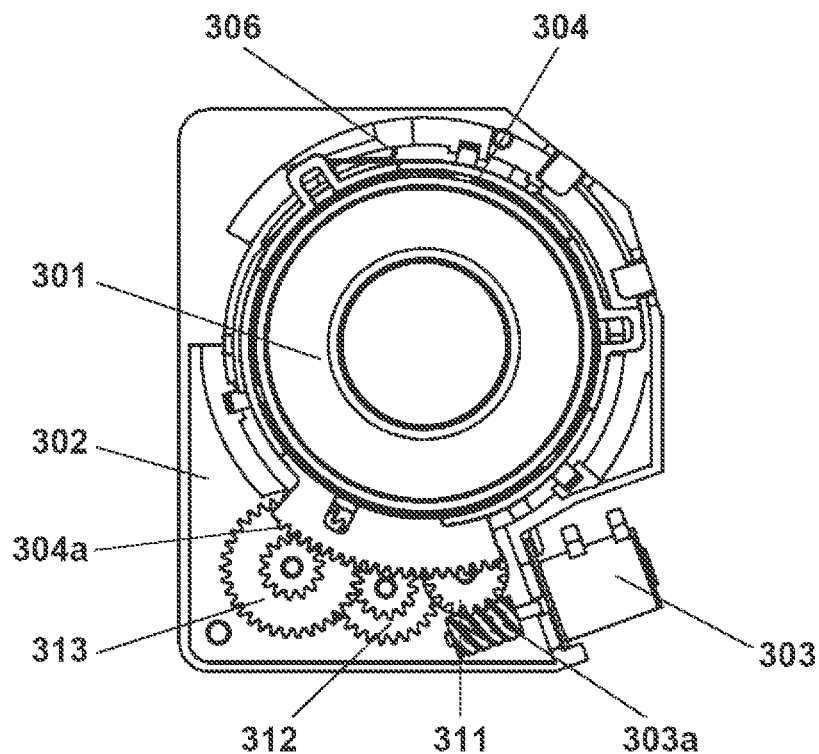
FIG. 13A is a bottom view of the driving actuator according to the third embodiment of the present invention (the projecting position)
Figure 13B:
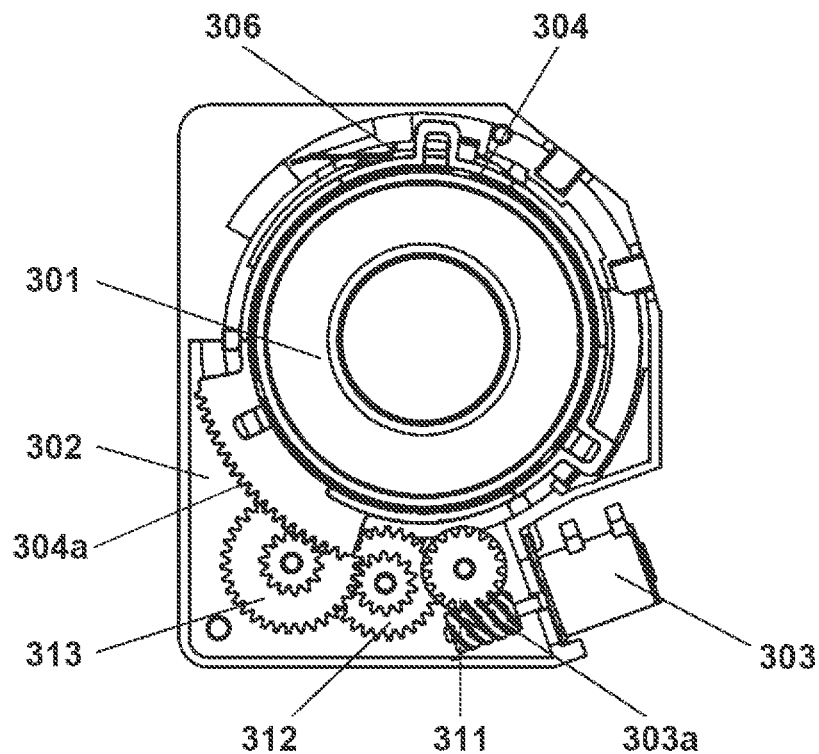
FIG. 13B is a bottom view of the driving actuator according to the third embodiment of the present invention (the accommodated position)

FIGS. 13A and 13B show bottom views (views seen from the front surface side of the smartphone S) of the lens driving actuator 300 according to this embodiment. The biasing member 306 is fixed by attaching one end portion to a slit formed in the upper cover 302. The upper cover 302 is retracted from the other end portion and its vicinity, so the biasing member 306 can elastically deform.

In the space between the upper cover 302 and the lower cover 305, the biasing member 306 is formed on the side opposite to the side on which a pinion 303a of the driving motor 303 and the driving gear teeth 304a are formed, with respect to the lens barrel 301. This makes it possible to arrange the biasing member 306 in a saved space by effectively using the space around the almost cylindrical lens barrel 301.

Also, when gears connected by a spur gear transmit the driving force, the gears generally generate a force in a direction in which the axes are separated from each other. When the third gear 313 and the driving gear teeth 304a of the driving cam member connected by a spur gear transmit the rotational force, a force is generated in the direction in which the axes are separated from each other. Since, however, the biasing member 306 is formed on the side opposite to the side on which the pinion 303a of the driving motor 303 and the driving gear teeth 304a are formed, with respect to the lens barrel 301, the biasing member 306 can perform biasing so as to cancel the force that separates the gears.

As has been explained above, the projecting position and accommodated position of the lens driving actuator 300 according to this embodiment can be switched. In the projecting position, the projecting state can accurately be held while reducing the power consumption.

In a portable terminal such as the smartphone S including the lens driving actuator 300 according to this embodiment, the projecting position in which the lens barrel 301 projects from the housing of the terminal is used as an imaging position. When an image sensor performs imaging, therefore, the imaging can be performed by moving the lens barrel 301 to the imaging position.

Fourth Embodiment

A lens driving actuator according to the fourth embodiment of the present invention will be explained below. Note that the basic configuration of this embodiment is the same as that of the third embodiment, so an explanation of the same components will be omitted by using the same reference numerals, and only different components will be explained.

Figure 14:
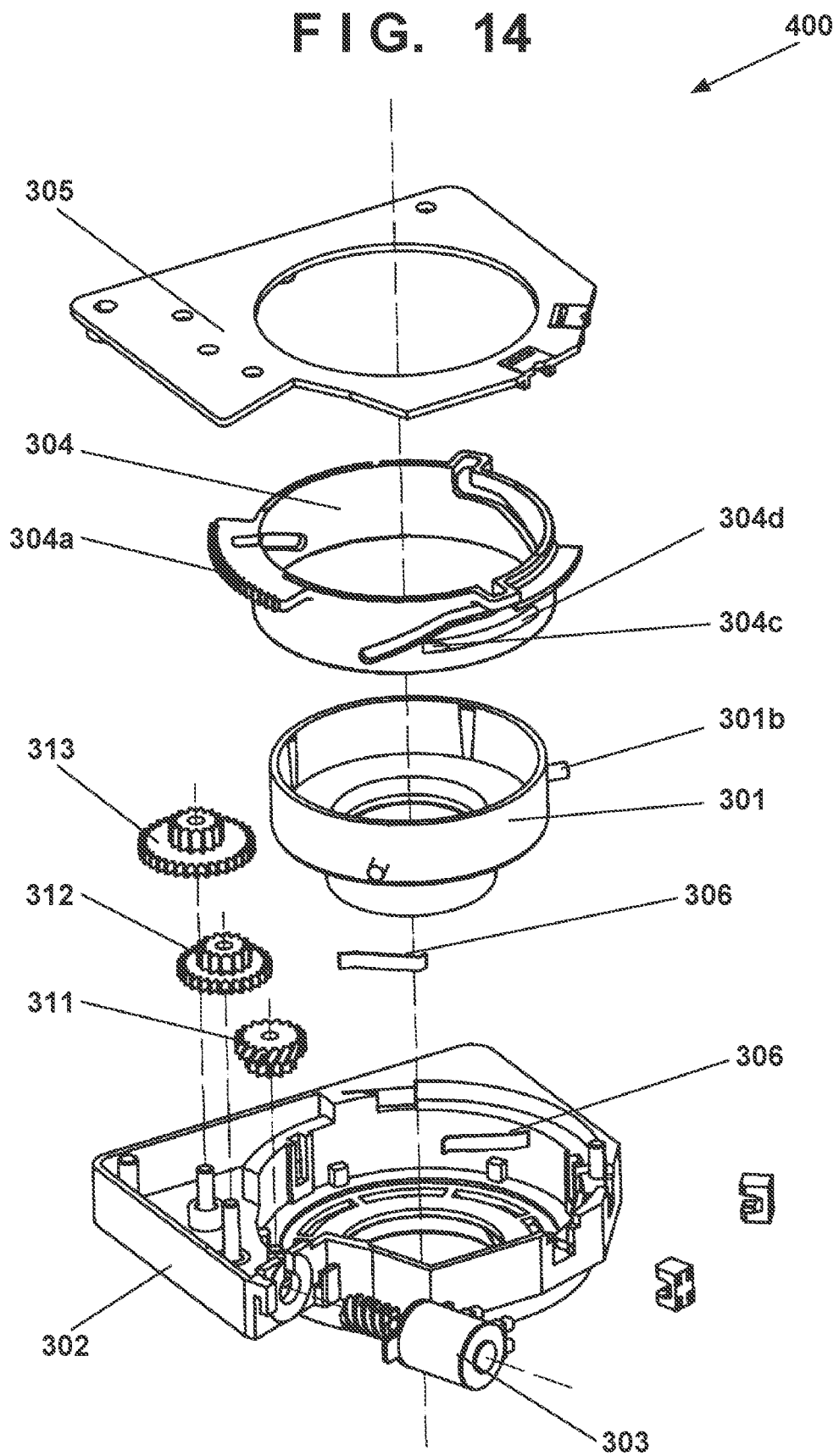
FIG. 14 is an exploded perspective view of a driving actuator according to the fourth embodiment of the present invention.
Figure 15A:
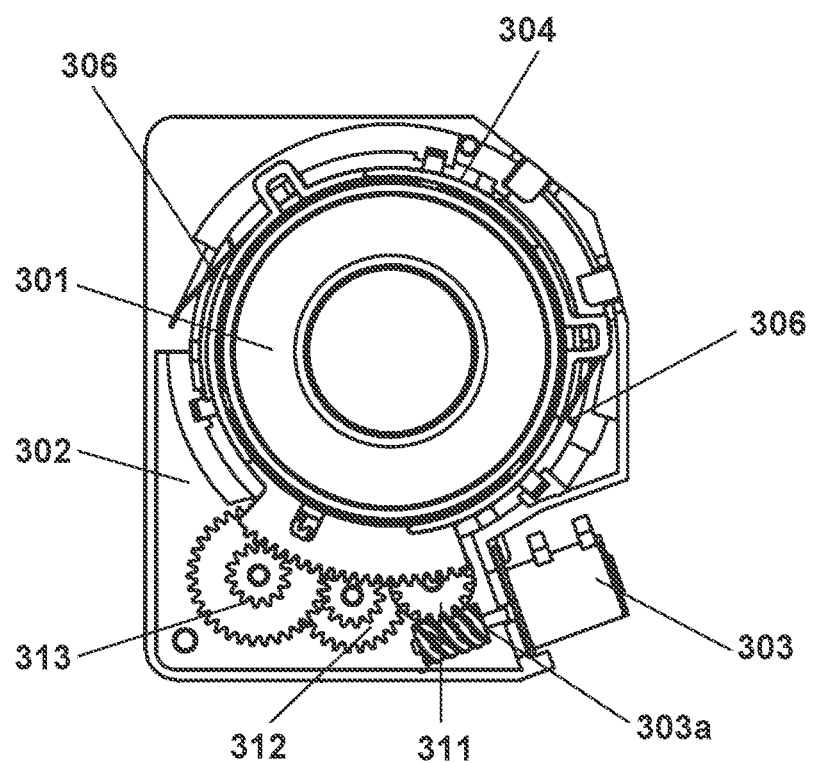
FIG. 15A is a bottom view of the driving actuator according to the fourth embodiment of the present invention (the projecting position)
Figure 15B:
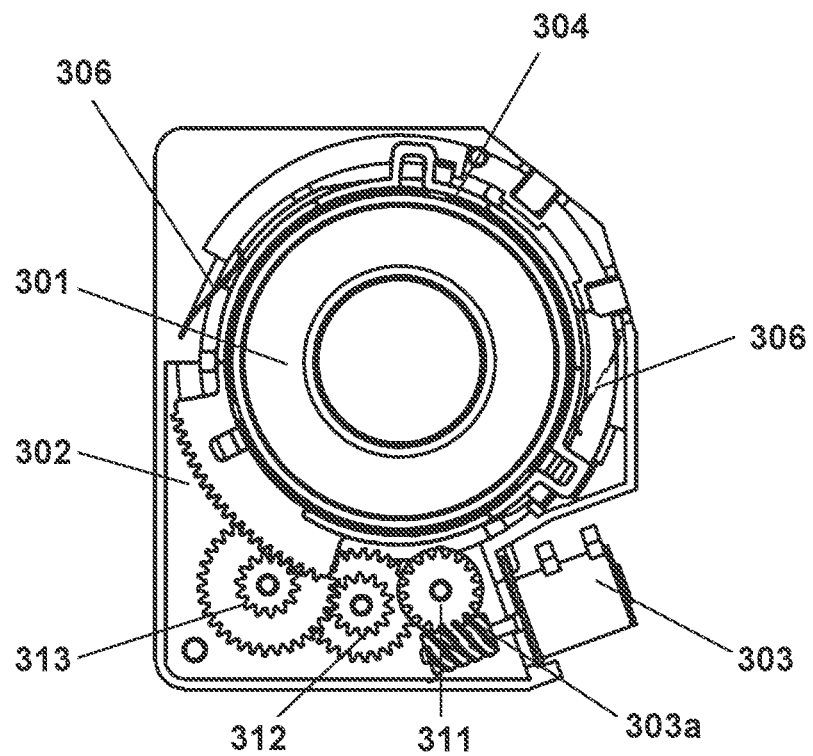
FIG. 15B is a bottom view of the driving actuator according to the fourth embodiment of the present invention (the accommodated position).

FIG. 14 is an exploded perspective view of a lens driving actuator 400 according to the fourth embodiment. This embodiment includes two biasing members 306. FIGS. 15A and 15B are bottom views (views seen from the front surface side of a smartphone S) of the lens driving actuator 400 according to the fourth embodiment.

The biasing member 306 is fixed by attaching one end portion to one of two slits formed in an upper cover 302. The upper cover 302 is retracted from the other end portion and its vicinity, so the biasing member 306 can elastically deform.

As shown in FIGS. 15A and 15B, the two biasing members 306 are arranged almost point-symmetrically with respect to a lens barrel 301. When the lens barrel 301 is in an extended state as shown in FIG. 15A, therefore, the two biasing members 306 push two portions 304c to be pushed of a driving cam member 304, thereby generating a couple of force in the rotational direction. When the lens barrel 301 is in an accommodated position as shown in FIG. 15B, the forces of the two biasing members 306 oppose each other and cancel out each other in the radial direction of the driving cam member 304.

Note that it is more favorable to match the direction of the resultant force of those forces of the two biasing members 306, which push the driving cam member 304, with the direction from the lens barrel 301 to a third gear 313, because the force that separates gears can be suppressed.

Although the embodiments of the present invention have been explained above, the invention is not limited to the foregoing embodiments, and various variations/changes are possible within the spirit of the invention.

What is claimed is:

1. A lens driving actuator comprising:
an upper cover having an opening for passing light;
a lens barrel arranged in the upper cover and including a light-transmitting lens;
a driving pin formed on an outer circumferential surface of the lens barrel;
a driving cam member formed to cover the outer circumference of the lens barrel, and having a cam groove that engages with the driving pin; and
a driving source configured to supply a driving force to a gear formed in the driving cam member,
wherein when the driving cam member rotates along the outer circumferential surface of the lens barrel, the driving pin is guided by the cam groove, and the lens barrel moves in an optical-axis direction with respect to the upper cover between (1) a projecting position in which the lens barrel projects from the upper cover and (2) an accommodated position in which the lens barrel is accommodated in the upper cover, and
wherein the upper cover includes an abutting portion with which the driving pin comes in contact in the projecting position.

2. The lens driving actuator according to claim 1, further comprising biasing unit configured to apply a biasing force in a direction in which the lens barrel moves to the projecting position.

3. The lens driving actuator according to claim 2, wherein the biasing unit is configured to come in contact with and bias the driving cam member, thereby moving the lens barrel to the projecting position.

4. The lens driving actuator according to claim 3, wherein the biasing unit does not bias the driving cam member when the lens barrel is in the accommodated position, and biases the driving cam member only when the lens barrel is in the projecting position.

5. The lens driving actuator according to claim 1, wherein a dustproof member for preventing entrance of foreign matter is formed into a ring-like shape between the lens barrel and the driving cam member.

6. The lens driving actuator according to claim 5, wherein the dustproof member is formed such that portions obliquely cut in the optical-axis direction in a portion of the ring-like shape in a circumferential direction overlap each other in the optical-axis direction, and
wherein in the portion of the driving cam member in which the dustproof member is formed, a pressing projection that projects toward the dustproof member is formed in a position corresponding to the portions of the dustproof member, which overlap each other in the optical-axis direction.

7. A portable terminal comprising:
a housing containing a lens driving actuator according to claim 1; and
an image sensor formed in a position facing the lens,
wherein when the image sensor performs imaging, the lens barrel is moved to a position where the lens barrel projects from the housing.

8. A lens driving actuator comprising:
an upper cover having an opening for passing light;
a lens barrel arranged in the upper cover and including a light-transmitting lens;
a driving pin formed on an outer circumferential surface of the lens barrel;

a driving cam member formed to cover the outer circumference of the lens barrel, and having a cam groove that engages with the driving pin;

a driving source configured to supply a driving force to a gear formed in the driving cam member; and at least one elastic member having one end fixed to the upper cover, wherein the elastic member biases the driving cam member in a direction in which the driving cam member rotates along the outer circumferential surface of the lens barrel.

9. The lens driving actuator according to claim 8, wherein a lens is operated between an imaging state and a non-imaging state, in the imaging state, the elastic member pushes a slope portion of a portion to be pushed formed on the outer circumference of the driving cam member, thereby biasing the driving cam member toward a rotation end portion, and in the non-imaging state, a contact state between the elastic member and the portion to be pushed is canceled, and the elastic member biases the driving cam member in a direction of a rotation center.

10. The lens driving actuator according to claim 8, further comprising a driving force transmission gear configured to transmit a driving force of the driving source to the driving cam member, wherein the at least one elastic member is arranged on a side opposite to the driving force transmission gear with respect to the driving cam member, and pushes the driving cam member against the driving force transmission gear.

\* \* \* \* \*